Patented Sept. 3, 1946

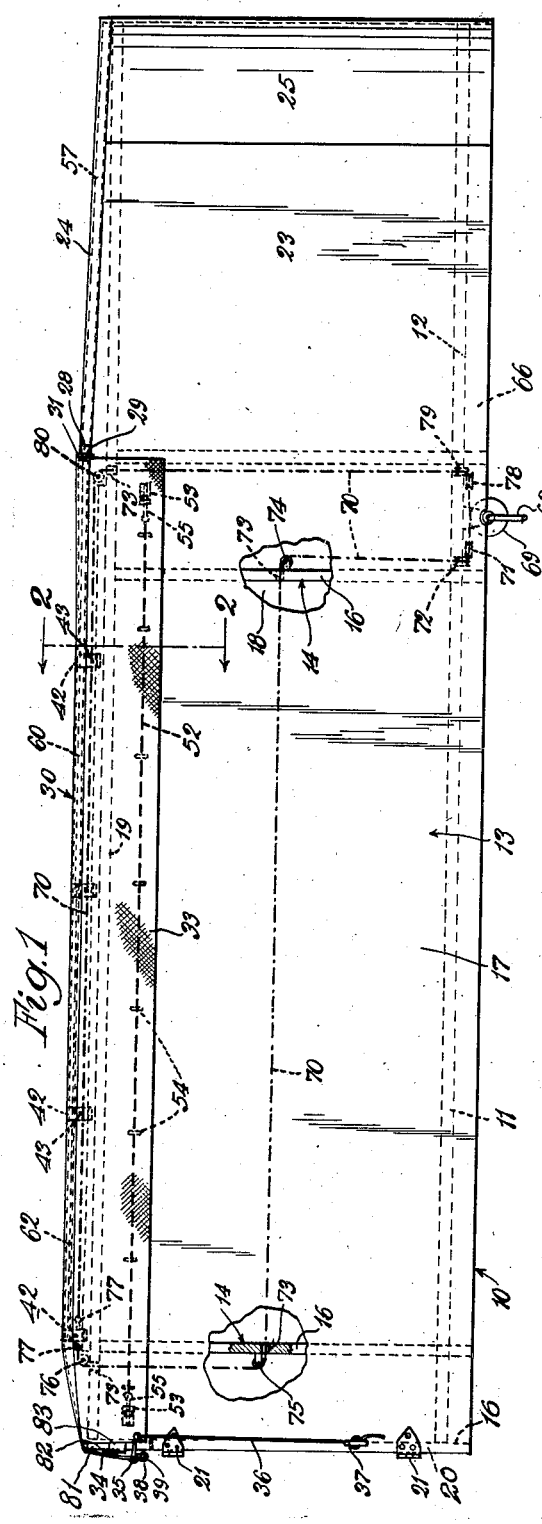

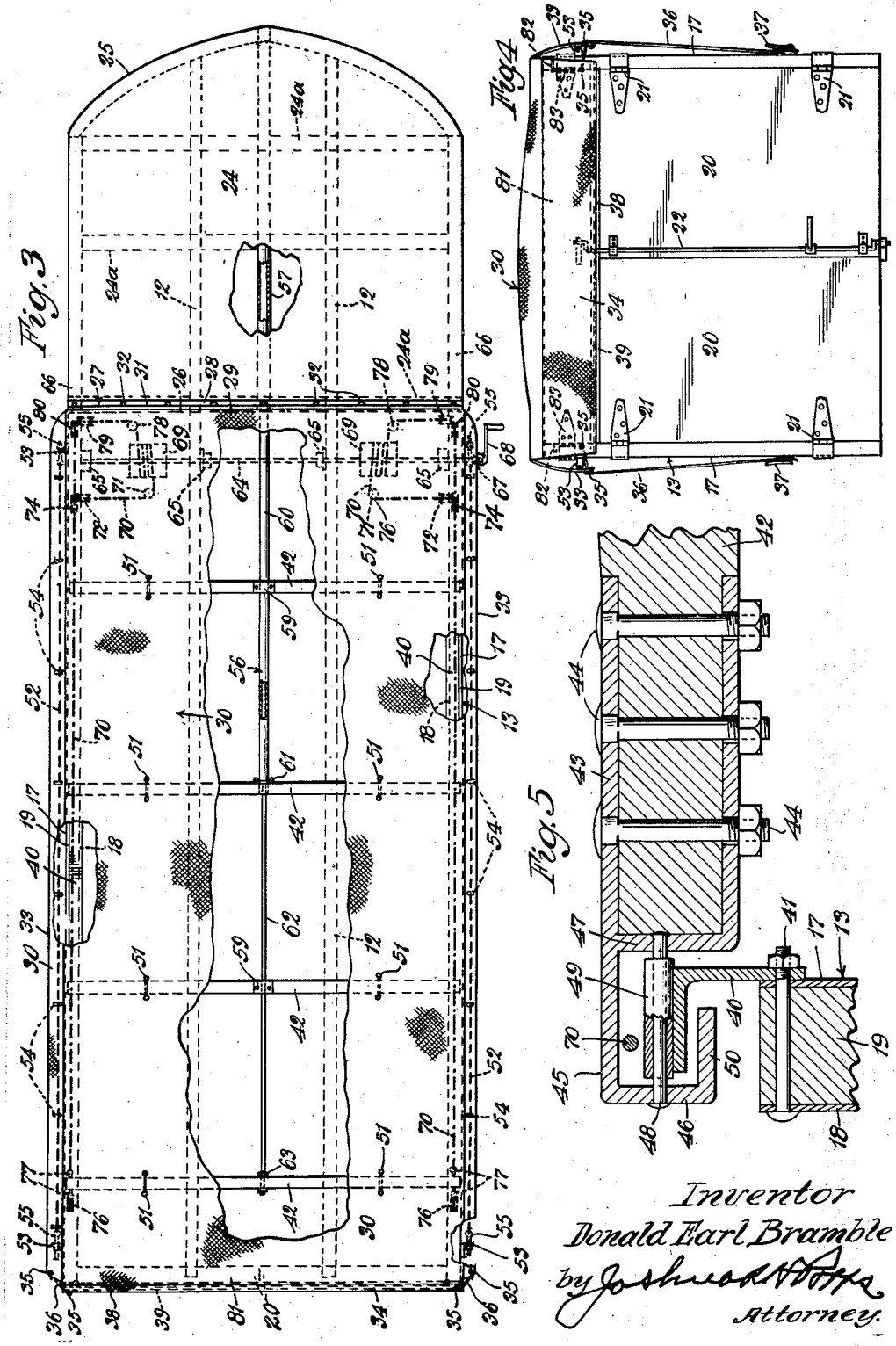

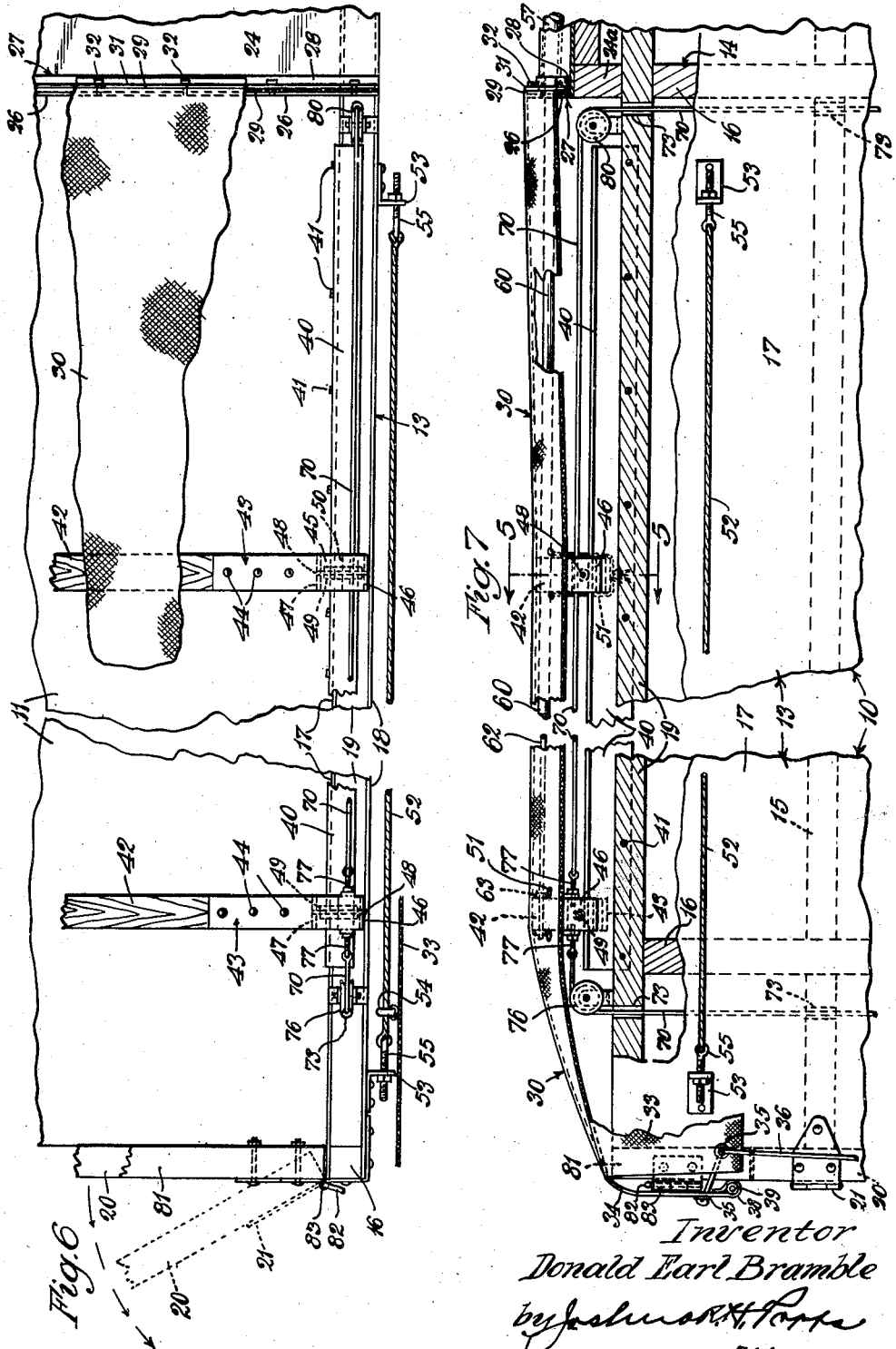

2,406,737

UNITED STATES PATENT OFFICE 2,406,737

TRAILER TOP

Donald Earl Bramble, Chicago, Ill., assignor of one-half to Theodore Bjorn, Chicago, Ill.

Application January 27, 1944, Serial No. 519,862

7 Claims. (Cl. 296—105)

My invention has reference to vehicle or truck body tops usually employing a tarpaulin or canvas cover, and more especially to tops for truck or trailer bodies, particularly trailers usually designed to be drawn by a motor driven or traction vehicle which customarily detachably couples to the trailer which usually has a running gear with ground wheels at the rear and props for supporting the front of the trailer body when uncoupled, which props are retracted or raised so that the traction vehicle pivotally supports the front end of the trailer, or similar wheeled vehicle, and permits turning by steering the traction vehicle while the trailer has a body for receiving and hauling merchandise.

The primary purpose of the invention is to provide a novel top or cover, usually of canvas or tarpaulin which may be easily and conveniently pulled rearwardly over the vehicle or trailer body to cover and protect the contents of the body especially in inclement weather, and to permit equal facility in drawing the canvas or tarpaulin cover forwardly to the front of the body or in the case of a trailer, to the rear edge of the permanent front part of the body, so as to uncover the top of the body to facilitate loading and unloading thereof by a crane or otherwise.

An important object of the invention is to provide a novel, simple, strong and efficient supporting structure for a canvas or tarpaulin cover constituting the top proper, and means for moving the same in reverse directions to covering and uncovering positions with the least possible effort and evenly all around, the tarpaulin being stretched or pulled taut in covering position and held in a simple and novel way so as to retain its position and not work loose or flap in the wind especially during transportation or while traveling and to maintain its weathertight position.

Another object is to provide a novel and strong supporting structure for the tarpaulin, especially with reference to the cross bows over which the tarpaulin is arranged and stretched so as to overlap or hang down over the sides of the trailer, truck or other vehicle body, and the mounting of the cross bows or bars constituting a collapsible frame over the top of the body for supporting the tarpaulin and to which the latter is connected for moving the same in reverse directions in opening and closing the top, so that said structure may be economically manufactured and easily installed on bodies initially or in applying the same to present or already constructed bodies in remodeling or reconstructing the same.

Another important object of the invention is to provide a novel sectional telescopic ridge-pole designed to support the tarpaulin centrally and longitudinally of the body top between the cross bows or bars forming ribs of the top frame across the open top of the body and connecting the tarpaulin to the cross bars and the movable telescoping sections of the ridge-pole to the cross bows so that when the tarpaulin of the top or cover is moved to uncovering position, it will drop down into folds to occupy a compact or minimum space and the sections of the ridge-pole will be telescoped or moved forwardly into a collapsed position into a tube or other housing protected beneath the roof of the permanent front part of the trailer or truck body, but will readily move to operative extended supporting position when the tarpaulin is extended rearwardly to cover the open top of the body.

A further object of the invention is to provide a novel means and structure so that the cover may be opened and closed without undue friction, at the same time providing a weathertight connection to prevent the entrance of rain or snow, and also prevent displacement of the cross bows and tarpaulin in any direction and permit operation with the least possible wear and tear.

Another and further object is to provide a novel cable arrangement for moving the top or tarpaulin in either direction by a single operating means or crank at one side near the front of the body, while causing uniform movement at both sides and in the longitudinal center of the top and tarpaulin, the actuating cables being arranged in a novel manner and the guides thereof being enclosed and hidden from view as well as protected from the weather or damage from the load in the body.

A still further object is to provide novel means for holding down the side portions or flaps of the tarpaulin and guiding the same in their movements when the top is opened and closed, and also to provide means for pulling the tarpaulin and sides or folded longitudinal portions thereof which extend over the longitudinal top edges and corners of the body at the top rails thereof, taut, rearwardly and downwardly and for anchoring the same, so as to keep the top and tarpaulin tight, especially during transportation.

A further object is to provide novel and simple means for connecting the front end and edge of the tarpaulin to the front of the body or rear edge of the permanent front portion of the roof thereof as in connection with a trailer, and in weathertight connection.

A still further object is to provide a novel antifriction means for movably or slidably supporting the cross bows of the top upon the top rails of the body sides, with tracks or guide members to support the same for movement, and to the structure of the ends of the cross bars or bows and coacting antifriction members or rollers and tracks on which the same operate with special regard to facility in mounting the same and the tracks on the top rails of the sides of the truck or trailer body, so as to move freely when operated and maintain their positions and relation, as well as to facilitate the construction and assembly of the parts.

Further objects and advantages will appear and be brought out more fully in the following specification, reference being had to the accompanying drawings, in which:

Fig. 1 is a side elevation of a vehicle cover shown as applied to a trailer top, with certain portions broken away.

Fig. 2 is an enlarged fragmentary transverse sectional view taken on the line 2—2 of Fig. 1.

Fig. 3 is a top plan view of the device as shown in Fig. 1 with certain portions broken away and in section.

Fig. 4 is a rear elevation of the device as shown in Figs. 1 and 3.

Fig. 5 is an enlarged fragmentary transverse sectional view taken on the line 5—5 of Fig. 7.

Fig. 6 is an enlarged fragmentary plan view of one side of the top with certain parts broken away and in section, and Fig. 7 is a side elevation of the parts shown in Fig. 6, partly broken away and in section.

While the invention may be applied to vehicle bodies in general and especially the wheel type as used in connection with motor vehicles or trucks, trailers and the like, it is especially adapted and shown applied to an open top trailer body in which substantially the rear two-thirds of the body is open at the top and the front one-third portion is closed and provided with a permanent roof usually of the conventional sheet metal type which is solid whereas the rear two-thirds of the roof consists of a flexible cover or tarpaulin of waterproof canvas or the like, secured to sliding or traveling cross bows which are moved from rear to front and vice versa to uncover and cover the open top portion of the trailer body. Such type of vehicle body is usually adapted for hauling dry freight and with the present top, particularly for freight which is more conveniently loaded by means of a crane, although the body may be loaded and unloaded in any suitable way.

Referring more particularly to the drawings in detail, the body 10 is shown provided with a platform or floor 11 which may be mounted upon a suitable running gear or frame 12 of which two transversely spaced longitudinal frame members are shown adapted to take the running gear which in the case of a trailer usually consists of rear ground wheels and front props by which the motor vehicle is permitted to be released from its usual pivotal connection with the trailer body by supporting the front thereof on the props. However, the manner of supporting the body is immaterial as it may be an ordinary truck body supported by any suitable ground engaging means. As shown, the body has sides 13 which may be of hollow construction with a frame 14 including longitudinal members 15 and vertical members 16 including rear corner posts, all of which is suitably connected and braced. The hollow sides are closed at the outside by a sheet 17 usually of metal and at the inside by a wall or sheet 18 usually of plywood or Compoboard made up of plies of wood with the grain running at right angles to each other. The top of the body is open and the sides are provided with top rails 19 also constituting longitudinal members while the back of the body is adapted to be closed by doors 20 hinged at 21 and provided with any suitable fastener or bolting means 22 by which it may be secured and if desired locked in closed position. The front portion of the body is closed as indicated at 23, this being the permanent front portion extending about one-third of the length of the body and may be the conventional sheet metal type which is solid and provided with a permanent solid roof portion 24 which also may be supported by cross bows or bars 24a as well as sloping slightly forwardly to facilitate draining the same. The sides 13 may extend to the transverse or curved front portion 25 as shown in Figs. 1 and 3 of the drawings. The rear edge of the front roof portion 24 extends transversely and may have a vertical edge 26 which in this instance is shown in Figs. 6 and 7 as the vertically extending rear flange or web of an angle bar 27 which is secured to the roof 24 through its horizontal flange or web 28. The purpose of this angle bar is to anchor or permanently connect the front edge 29 of a flexible cover or tarpaulin 30 of canvas or the like to the rear edge of the roof 24 at the front of the open top portion of the body and for this purpose said front edge may be folded over the flange 26 and held by a strip 31 against the folded edge and bolted or otherwise secured along the lengths thereof as indicated at 32. These parts are preferably of metal but not necessarily so.

The longitudinal side portions of the tarpaulin are preferably provided with overhanging portions or side flaps 33 which terminate at the rear end of the body or sides 13 thereof and the back end of the tarpaulin is provided with a rear or tail flap 34. In the corners of which flaps, eyelets, or grommets 35 or other suitable means may be provided to take ropes or the like 36 for anchoring or tying down the ends of the flaps against the sides and back or doors of the body and holding the same taut and tightly against the sides and doors by anchoring the ends of the ropes such as to cleats 37 secured to each rear corner post 16. A seam or hem 38 is provided across the rear edge of the tarpaulin and a rod 39 is inserted therein, preferably of one-half inch round metal stock to hold the rear end straight and down against a rear header to be later described, above the doors.

Secured to and along the top rails 19 at the top of the sides 13, tracks are provided preferably in the form of angle rails 40 bolted through the top rails as indicated at 41 through the vertical flanges or webs of the angle iron bars preferably at the inner walls of the sides 13 so that the horizontal webs form tracks extending horizontally outwardly over the top rails and terminating short of the outer sides or walls of the body sides 13 as more particularly shown in Figs. 2 and 5 of the drawings. A plurality of transversely extending cross bows or bars 42 are mounted to move longitudinally of the open top at suitably spaced intervals, preferably equidistantly, from the roof 24 to a point near the rear end of the body. The ends of the cross bows are provided with brackets or end members 43 having spaced upper and lower portions bolted through reduced end portions of the cross bows as indicated at 44. The top portions 45 of these end members 43 extend outwardly over the tracks and have downwardly extending or depending portions 46 which together with the spaced inner portions 47 form bearings or mounting means for shafts 48 which may be fixed or rotatable in holes in the portions 46 and 47 and on which antifriction members or rollers 49 may be rotatably mounted. The end members have inwardly extending lower portions 50 which extend beneath the horizontal portions of the tracks formed by the angle members 40 so that the end members and cross bows are precluded from displacement laterally or inwardly and outwardly in either direction as well as upwardly and the cross bows are mounted to move along the tops of the sides 13 with a minimum of friction but the parts are so interlocked as to be protected interiorly from the effects of inclement weather especially with the overhanging side portions or flaps 33 covering the same and preventing the entrance of rain or snow so as to protect the contents of the body. Four cross bows are shown in connection with the rear, and spaced cross bows 24a permanently attached to the front roof portion 24, but any suitable number may be employed depending somewhat upon the length of the body. Short ropes 51 or other suitable means may be employed for connecting the tarpaulin to the cross bows 42 preferably on opposite sides of the longitudinal center thereof. The side flaps 33 extend a short distance down over the sides 13 and may be slidably connected to the body by providing longitudinal guide members 52 shown in the form of cables anchored at their ends to brackets 53 secured against the sides 13 adjacent each end thereof in spaced relation to and near the top rails and brackets or top edges of the body sides so that the cables extend parallel thereto. The side flaps 33 therefore overlie the cables and may have loops or snap hooks 54 detachably and slidably engaged with the cables or guide members 52 to permit disconnection as well as to permit the cover or tarpaulin 30 to be extended rearwardly to cover the top of the body or to be moved forwardly in collapsed position with depending folds toward the front of the body whereby to uncover the open top of the latter. Suitable turnbuckles or adjustable eyebolts 55 may be provided to connect the ends of the cables 52 to the brackets 53 to take up slack and maintain the cables taut. Obviously the guide members 52 may be rods or other suitable members as long as they are spaced from the sides, or other suitable sliding connection may be made between the side flaps 33 and the sides 13.

Extending longitudinally of the body to somewhat brace the cross bows and better support the tarpaulin as well as guide the cross bows in their movements rearwardly in spaced relation and forwardly toward one another in collapsing or contracting the cover in opening the same, one or more ridge-poles 56 may be provided. As shown, this ridge-pole is extended longitudinally and centrally of the body and consists of a plurality of sections which are collapsible or extensibly relative to each other or telescopically connected and may consist of a tubular section 57 permanently anchored in the cross bows 24a of the permanent front portion beneath the roof 24 and extends from the front end to the rear end thereof where it terminates at the rear edge of the solid top or roof. This section 57 may be a one-inch metal tube and is held in any suitable manner beneath the roof 24 as by disposing the same in notches 58 in the cross bows or roof frame and may be fastened by metal plates or straps 59. The next section 60 of the telescopic ridge-pole is shown extending within the rear end of the section 57 in slightly overlapping relation in extended position and between the rear cross bow of the roof and the distance between two additional cross bows 42 and may be a one-half inch metal pipe or tube. The forward end and intermediate portion of the section 60 are therefore free to slide with respect to the bows at such points but the rear end is anchored to the cross bow 42 at such point as indicated at 61 by means of a plate or strap secured against the pipe to clamp the same at the top of the bow as is the plate or strap 59 or against the front face of the bow and suitably secured by screws, bolts or the like. The rear end of the section 60 receives a section 62 of smaller diameter with its front end extending slightly into the rear end of the tubular section 60 when the top is extended, and this section 62 may be a three-eighths inch metal rod. It is slidable with respect to the cross bow 42 to which the section 60 is anchored and also with respect to the cross bow 42 intermediately of the ends thereof, but the rear end of the section 62 is anchored to the rear cross bow 42 as indicated at 63, in any suitable manner or may be simply held by nuts on the end of the rod section 62 engaging opposite faces of the cross bow at such point. It will be noted that the rear cross bow 42 is spaced from the rear end of the body and this space is covered by the tarpaulin 30 which is shown curving or slanting down at the back to the rear or tail flap 34 where the latter bends over a rear header 81, above the doors 20, forming a rear cross member or bar at the back end of the body, so as to entirely cover the latter. Thus, when the tarpaulin 30 is drawn rearwardly to cover the body, the sections of the ridge-pole 56 are extended as more particularly shown in Fig. 3 of the drawings and when the tarpaulin is moved forwardly to collapsed or folded position whereby to uncover the top of the body, the section 62 moving with the rear cross bow 42, slides through the cross bows forwardly thereof and into the tubular section 60 which subsequently moves into the large tubular section 57 beneath the roof 24, inasmuch as these sections are also substantially of the same length.

Means is provided to move the flexible fabric cover or tarpaulin 30 to the positions referred to by disconnecting the ropes 36 from the cleats 37 so as to release the side and end flaps 33 and 34 for movement from the positions in which they are tied down and held against the sides and back of the body and the flap 34 may be folded or thrown forwardly with the back end of the tarpaulin so as to lay thereon, such as forwardly of the rear cross bow 42. The means shown for moving the tarpaulin to cover and uncover the top of the body may consist of a straight transverse shaft 64 journaled in suitable bearings 65 on the longitudinal frame members 12 and side rails 66 of the body at the flooring. One end of the shaft 64 is squared and extended to the side of the body as indicated at 67 to take a detachable crank 68 by which the shaft may be turned in either direction or the shaft may be otherwise suitably driven manually or by power. The shaft bears a pair of winches or drums 69 which are fixed thereto and on which cables 70 are wound in opposite directions. These cables as well as the cables forming the guides 52 may be three-sixteenth inch cables or otherwise. One end of each cable is extended around a vertically journaled guide pulley 71 in the rear of each winch and then horizontal outwardly under a horizontally journaled guide pulley 72 suitably supported by the body or frame substantially beneath the hollow sides 13 and then upwardly through the latter between the inner and outer walls thereof, through suitable holes 73 provided in the side frames 14. These cables are then extended horizontally over guide pulleys 74 and then horizontal rearwardly to the rear corner posts or other suitable vertical frame members, where they are extended around guide pulleys 75 and then upwardly near the rear end of the body over guide pulleys 76 supported on the top rails 19 rearwardly of the rear cross bow when extended and to which the end of the cable is anchored as by suitable take up means consisting of a turnbuckle or eyebolt 77 bolted through the rear cross bow and held by a nut threaded thereon for adjustment so that any slack in the cable may be taken up to maintain the cables taut. The other ends of the cables are extended forwardly of the winches around vertically journaled guide pulleys 78 also journaled in the frame or beneath the flooring and then outwardly under horizontally journaled guide pulleys 79 beneath the hollow sides 13 of the body, from which points, the cables are extended vertically upwardly and over guide pulleys 80 also mounted on the top rails 19. From this point, the cables extend rearwardly through the cross bows 42 beneath the top or tarpaulin 30 and preferably in the space within the brackets or end members 43 between the top portions 45 and the rollers 49 upon which they may rest and move freely with the rotation of the rollers. The rear extremities of these end portions of the cables are connected to the rear cross bow in the same manner as the opposite ends by take up devices consisting of adjustable eyebolts or turnbuckles extended from the opposite sides or faces of said cross bow but for the same purpose, namely to take up slack in the cables and maintain the same taut. As will be noted from Figs. 1, 3, 6 and 7 of the drawings, the pulleys 76 and 80 are located beyond but adjacent to the ends of the angle bars or rails 40 and may serve as means for limiting the movements of the cross bows and cover of the top to extended or collapsed positions. In operating the device, the crank 68 is applied to the end 67 of the shaft 64 and by turning the crank and shaft to the left as seen in Fig. 3, the cables 70 which extend over the top rails and tracks and onto the winches 69 from the guide pulleys 78, are wound on the winches while the other portions leading over the guide pulleys 71 are unwound, thus moving the rear cross bow 42 forwardly until it engages the next cross bow forwardly thereof and then the next cross bow and so on until all of the cross bows have been moved forwardly to the rear cross bow or transverse bar 24a of the roof 24 to collapsed position so as to uncover the top of the body. The top is thus opened and will result in the tarpaulin being drawn to the forward portion of the open top of the body and the portions of the tarpaulin between the ribs will close in bellows-like fashion and drop in folds over the ridge-pole 56. As the cross bows move forwardly, the section 62 of the ridge-pole will move into tubular section 60 and these two telescoped sections will then move into the housing section 57 which is held stationary beneath the roof 24 constituting the solid or permanent portion of the roof of the vehicle body. During this movement, the cables will freely slide through the bows and this will also be the case when the top is closed or extended rearwardly to cover the open top of the body. To do this, it is simply necessary to turn the crank and shaft to the right or in the opposite direction to oppositely wind and unwind cables so as to pull rearwardly on the rear cross bow which will successively space the cross bows and extend the cover to the rear of the body in the reverse order from that in which said parts move when the top is opened as heretofore explained. When so extended, the tarpaulin may be tied down by drawing the flaps 33 and 34 together and tightly over the top of the body by the ropes 36 and anchored to the cleats 37 so as to positively retain the tarpaulin tight whereby the body is maintained weathertight to protect the contents thereof. Obviously when the tarpaulin or cover is opened and closed in the manner described, it will move along the guide members or cables 52 at the sides of the body by being slidably connected therewith and held down during such movements to retain its smooth condition to facilitate same by reason of the loops or snaps 54 engaging the guide members or cables 52 at such points beneath the side flaps or overhanging portions 33. The extensible ridge-pole will automatically collapse or telescope when the top is opened to be similarly extended when the top is closed by reason of the sections thereof being connected at their rear ends to certain of the cross bows in the manner described, and will also help to support and sustain the tarpaulin instead of permitting the same to drop down at the center beneath the cross bows either in open or closed position and also facilitate draining of the top or roof of the body. Aside from the permanent or solid roof portion 24, the device may be economically produced and applied initially to trailer or other truck bodies, or to those heretofore constructed for modification in accordance with the present invention.

While any suitable means may be employed for fastening the rear doors 20, the fastener or bolting means 22 is shown engaging keepers at the top and bottom of the body at the back and the doors terminate at the top below the rear or tail flap 34 beneath which and at the top of the body at the back a solid or one piece rear header 81 is provided, anchored by means of removable pins 82 at the ends engaging interfitting hinge loops or eyes 83 carried by the ends of the header and the rear ends of the sides at the rear corner posts so that when the rear or tail flap 34 is raised or the top is open, a pin may be removed from either end of the rear header so that it may be swung open horizontally on its hinge or pivot to either side so that the entire back of the body is open and unobstructed when the doors are opened. Of course, since the doors 20 do not extend as high as the lower edge of the rear or tail flap 34, the doors may be opened at any time by unbolting the fastener 21, without disturbing the rear or tail flap.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

Having thus described my invention, what I claim is new and desire to secure by Letters Patent is:

1. In combination with a vehicle body having an open top, sides extending to the top of the body, a permanent front portion having a roof and a transverse member at the rear of the roof with a vertical portion, a tarpaulin having its front edge anchored to said portion, cross bows having antifriction members movable along the top of the sides and associated therewith to prevent lateral and upward displacement of the cross bows, connections between the cross bows and the tarpaulin, a collapsible ridge-pole extending longitudinally of the body at the bows and movable with certain of the latter to a collapsed position at the front portion, and means connected to the rear cross bow to move the cross bows and tarpaulin to positions to cover and uncover the body.

2. In combination with a vehicle body having an open top, closed sides and a front, said sides extending to the top of the body, spaced cross bows having antifriction members at the ends thereof, rails at the top of the sides along which said friction members are adapted to move, a sectional telescopic ridge-pole extending longitudinally of the top of the body and comprising sections adapted to move relatively with the cross bows to telescope at the front of the body, a tarpaulin connected to the bows and having a tail flap and side flaps, and guide members secured to the outer faces of the body sides and slidably connected to the side flaps.

3. In combination with a vehicle body having an open top, closed sides and a front, said sides extending to the top of the body, spaced cross bows having antifriction members at the ends thereof, rails at the top of the sides along which said friction members are adapted to move, a sectional telescopic ridge-pole extending longitudinally of the top of the body and comprising sections adapted to move relatively with the cross bows to telescope at the front of the body, a tarpaulin anchored to its front end to the front of the body and connected to the cross bows to be extended rearwardly to cover the body, cables connected to the rear cross bows at opposite sides of the body, said cables having portions extending along the top of the body sides and then downwardly adjacent the front end of the tarpaulin and other portions extending downwardly adjacent the rear of the body and then forwardly and downwardly, guide means on the sides for said cables, a transverse shaft suitably journaled adjacent the bottom of the body, drums on said shaft on which said cables are wound in opposite directions and means for turning the shaft to cover and uncover the body.

4. In combination with a trailer body having sides, a front portion with a permanent roof and a transverse rear edge, spaced cross bows having their ends movable along the top edges of the sides substantially in line with the roof, a ridge-pole comprising telescopic sections movable one within the other and including a stationary front section beneath the roof, the movable sections being connected at their rear ends to certain of the cross bows, a tarpaulin connected at its front end to the transverse rear edge of the roof and to the cross bows, and means connected to the tarpaulin through the rear bow to move the tarpaulin into positions to cover and uncover the body.

5. In combination with a truck or trailer body open at the top, spaced cross members having their ends movable along rails at the top of the body sides and held from lateral and vertical displacement relative thereto, and an extensible ridge-pole comprising sections movable relatively the length of the open top and contiguously when retracted, each section being secured to a cross member to move successively therewith.

6. In combination with a truck or trailer body open at the top, spaced cross members having their ends movable along rails at the top of the body sides and held from lateral and vertical displacement relative thereto, and an extensible ridge-pole comprising sections movable relatively the length of the open top and contiguously when retracted, means to move the sections successively, a tarpaulin over the open top and anchored at one end and to the cross members, and means connected to the opposite end of the tarpaulin to move the same in opposite directions to cover and uncover the open top of the body.

7. In combination with a truck or trailer body open at the top, spaced cross members having their ends movable along rails at the top of the body sides and held from lateral and vertical displacement relative thereto, and an extensible ridge-pole comprising sections movable relatively the length of the open top and contiguously when retracted, and means to move the sections successively.

DONALD EARL BRAMBLE.